United States Patent [19]

Scott

[11] Patent Number: 4,734,992

[45] Date of Patent: Apr. 5, 1988

[54] DRAWING INSTRUMENT

[76] Inventor: Alastair G. Scott, Little Trostrey Farm, Near Usk, Gwent, Wales, NP5 1LD

[21] Appl. No.: 932,432

[22] Filed: Nov. 19, 1986

[30] Foreign Application Priority Data

Nov. 20, 1985 [GB] United Kingdom ............... 8528601

[51] Int. Cl.$^4$ .............................................. G01B 3/38
[52] U.S. Cl. ................................... 33/403; 33/27.02; 33/153 E
[58] Field of Search .................................. 33/495–500, 33/405, 422, 424, 149 R, 153 B, 153 E, 403, 452, 456, 458, 471, 148 E, 27.03, 27.02, 27.01

[56] References Cited

U.S. PATENT DOCUMENTS

| 363,321 | 5/1987 | Douglas | 33/499 |
| 1,332,887 | 3/1920 | Collins | 33/27.03 |
| 1,690,832 | 11/1928 | Owen | 33/497 |
| 1,972,759 | 9/1934 | Burnette | 33/465 X |
| 4,535,542 | 8/1985 | Liu | 33/403 X |

FOREIGN PATENT DOCUMENTS

| 997909 | 9/1951 | France | 33/471 |
| 1134676 | 11/1968 | United Kingdom | 33/471 |

Primary Examiner—Harry N. Haroian
Attorney, Agent, or Firm—Larson and Taylor

[57] ABSTRACT

A drawing instrument incorporates two substantially planar members each formed with a straight guide edge and a mechanism connecting the members to permit them to rotate relatively to one another in parallel planes about an axis located in the vicinity of one end of each guide edge from one extreme position in which the guide edges lie together to another extreme position in which the guide edges are collinear. The mechanism connecting the members comprises a curved connecting piece in permanent sliding and interlocking engagement with curved channels in said two members the arrangement providing that there is no obstruction between the guide edges along their entire length irrespective of their immediate relative angular positions. The drawing instrument may include frictional damping mechanism comprising resilient tabs presented by the slide member and arranged to bear frictionally against respective planar members. The tabs may be arranged to abut against projections on the respective planar members when the planar members are in the position in which their guide edges lie together.

9 Claims, 2 Drawing Sheets

DRAWING INSTRUMENT

The present invention relates to an instrument for drawing and graphical use.

Known protractors and bow compasses are extensively used in conjunction with a ruler in the production of scale drawings.

In the case of the protractor, the ruler is used to provide both a drawing and a measuring edge. Several steps are required in order to draw a line from a point at a specific angle with respect to another line using a protractor. After locating the pole of the protractor on the point in the appropriate orientation, a mark must be made on the drawing surface to record the angle selected before joining the point and the mark to produce the required line. Further, such protractors do not facilitate the accurate determination of angles defined by lines shorter than the radius of the protractor or which lie wholly beyond its circumference, thereby necessitating the extension of at least one of the lines so as to intersect the scale of the protractor on its circumference.

Known devices that directly draw angles without the multiple steps associated with the protractor and ruler are already known and fall into two main categories.

The first category includes those instruments the drawing edges of which are not collinear with their centre of rotation. Consequently as these drawing edges are rotated to make different angles with one another their points of intersection continuously change. This inhibits the use of a scale on the drawing edges and eventually results in the eclipse of one edge by the other before they reach 180° rotation.

The known type of adjustable set-square is one example of this category. It can be used for presetting angles over a very limited range and needs to be moved whenever the angle is adjusted. Also, since the adjustable drawing edges of such a device do not intersect at the pole of its angular measure scale throughout relative rotation of these edges with respect to each other, a line cannot be described from this pole along one of the drawing edges in a direct manner.

The second category to which the present invention belongs includes those instruments the drawing edges of which are collinear with their centre of rotation. These instruments are easier to use but in the previously known devices the drawing edges are connected by mechanical arrangements all of which present obstructions which prevent lines from being drawn from the centre of rotation along the drawing edges without obstruction. Such a known instrument is described in the specification of U.S. Pat No. 4,004,347. The instrument described in this U.S. patent specification clearly suffers from the disadvantage described, i.e. it is impossible to draw continuous lines from the origin of an angle out to the extremity of the two guide edges because of an obstruction presented by the structure of the instrument.

It is an important object of the present invention to provide an instrument which makes it possible to draw the boundary lines defining any angle up to 180° from the origin to the end of the guide edges without interruption.

A further object of the present invention is to provide an instrument capable of performing the function of a compass the drawing radius of which may be determined directly without the use of a ruler.

A drawing instrument according to the present invention comprises two substantially planar members each formed with a straight guide edge, means connecting the members to permit them to rotate relatively to one another in parallel planes about an axis located in the vicinity of one end of each guide edge so that in any particular position of relative rotational displacement of the two members about said axis the guide edges which are arranged to be co-planar define a particular angle between them with the origin of the angle in the vicinity of said axis, characterized in that no part of each member projects beyond any part of the guide edge presented by that member or beyond any extension of the line of said guide edge and that the two members are formed with channels curved about said axis as their centre of curvature and a curved connecting piece is in permanent sliding and interlocking engagement with the channels in said two members, the arrangement providing that there is no obstruction between the guide edges along their entire length irrespective of their immediate relative angular positions.

Thus, with this invention, an angle may be drawn from a point with respect to a given direction by aligning one guide edge with that given direction, with the axis referred to coinciding with that point, rotating the other edge to a position directed by the scales, and drawing a line from the axis along that other edge.

Similarly, suitable alignment of the guide edges and the axis allows angles to be measured in a simple fashion. Further, the instrument does not require a coincidence between a line whose orientation is to be determined and the angular scale in order to determine the orientation of such a line.

At least one of the guide edges may bear a linear scale, a reference point on which coincides with the fixed axis throughout relative rotation of the two members. This facilitates the drawing and determination of vectors. The guide edges may extend beyond the radius of an angular measure scale marked on one of the members making it possible also to obtain information about lines and points which lie outside that radius.

The guide edges maynot intersect precisely at the fixed axis but may be displaced by a small uniform distance from said axis to guide a scribing or a drawing implement having a finite width adjacent the guide edge along a path intersecting the fixed axis.

One of the members may be provided with a compass point engageable with a surface so that the entire instrument may be swung on the surface about the compass point and the other member may be provided with at least one hole for passage of a scribing or a drawing implement the marking point of which is to be engaged with the surface. The distance between the compass point and the hole is adjusted by rotation of the members relative to one another about the fixed axis. This embodiment of the present invention, therefore, provides the additional function of a compass. A scale may be provided on one of the members to indicate the distance between the compass point and the through hole. The compass point may be presented by a pin arranged to be vertical at all radius settings thereby avoiding the scarring of the drawing surface which is often produced by bow compass points.

One member may be formed with a line of through holes arranged at equal successive intervals in a straight line, the compass point being provided on the other member. The axis of the pin presenting the compass point and of each of the holes is preferably substantially parallel with the fixed axis. Relative rotation of the members about the fixed axis causes the compass point to move in an arcuate manner to and from the line of holes. When the members are in a pre-selected angular orientation relative to one another each of the holes is disposed at a predetermined distance from the compass point. A calibrated scale may be provided on one of the members. Relative rotation of the members to and from the pre-selected orientation between the two extremes of the calibrated scale displaces the compass point through a distance equal to the interval between adjacent holes. The direction of this displacement is preferably parallel to and collinear with the row of through holes.

Means may be provided to damp relative rotational movement between the two members. Alternatively, or in addition, clamping means may be preferably provided to hold one member in a selected orientation with respect to the other member.

A practical embodiment of the present invention is illustrated in the accompanying drawings in which.

Figure 1:
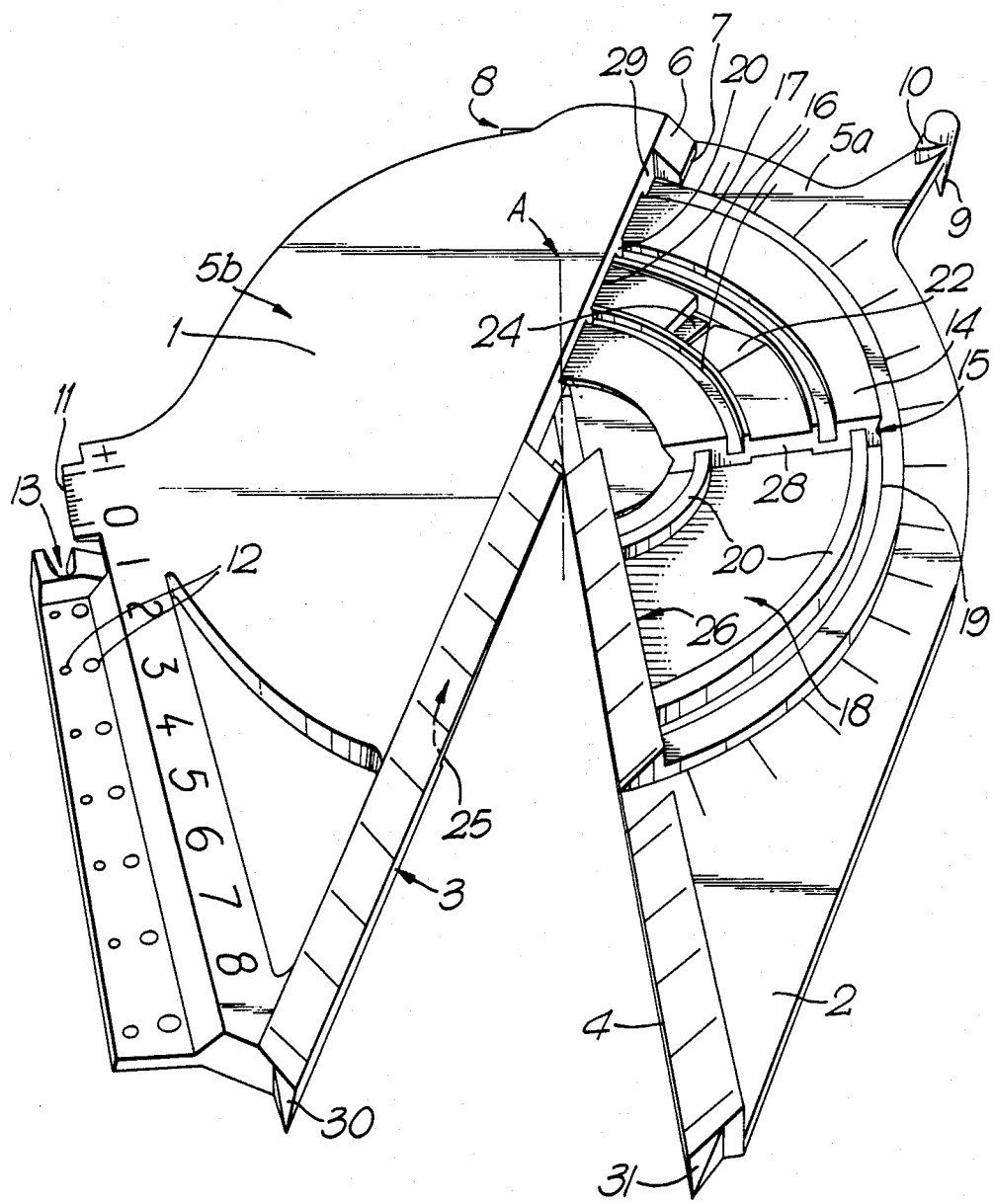
FIG. 1 is a perspective view of an instrument.
Figure 2:
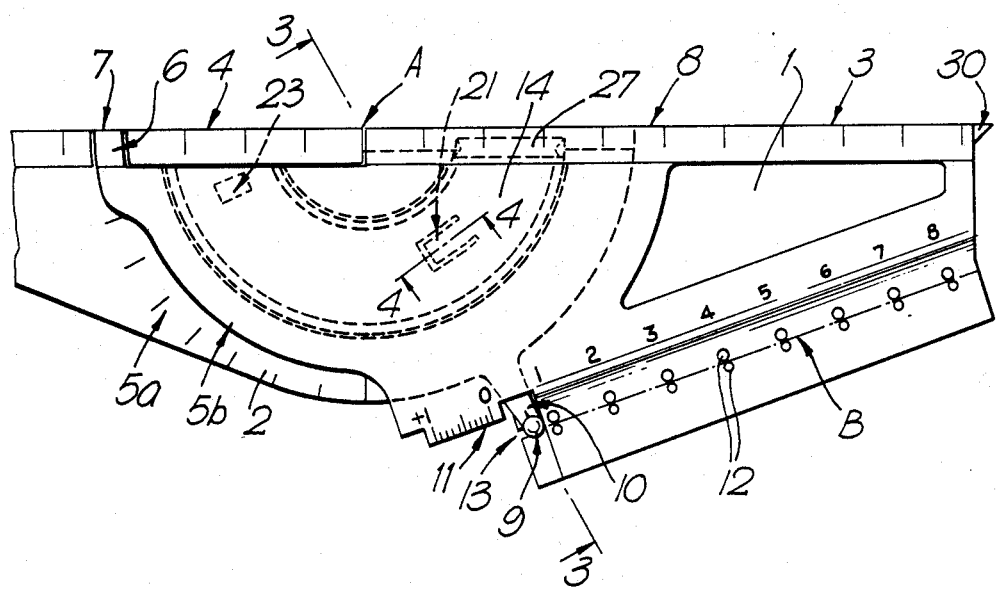
FIG. 2 is a plan view of the instrument with guide edges in a collinear position.
Figure 4:
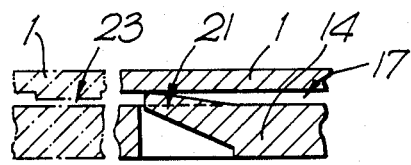
FIG. 4 is a longitudinal section through the line 4—4 in FIG. 2.
Figure 3:
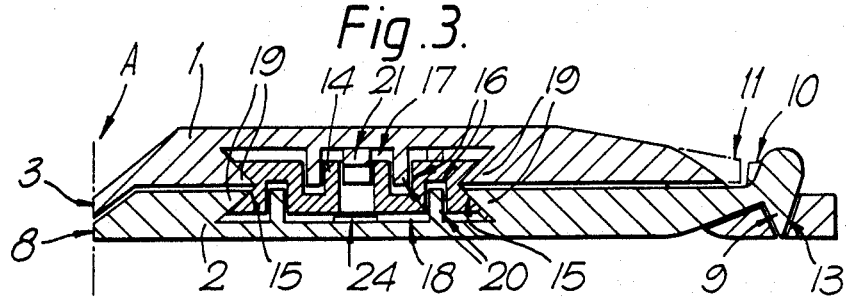
FIG. 3 shows a section taken on the line 3—3 of FIG. 2 in the direction indicated, this section being shown on an enlarged scale.

In the embodiment shown in the drawings the instrument comprises two members 1 and 2 having a respective guide edge 3 and 4. The members 1 and 2 may be formed of a transparent material. The member 1 is mounted on the member 2 for relative rotation about an axis A by means of a slide arrangement. This axis A is perpendicular to and intersects both guide edges 3 and 4.

The member 2 is substantially semi-circular in plan and bears an angular measure scale 5a on its circumferential portion whose pole coincides with axis A. This scale 5a bears two ranges, one of which extends from 180° on edge 4 to 360° on an edge 8 at the other end of the circumference of the second member. The other range extends from 0° on edge 8 to 180° on edge 4.

A linear scale is provided on the member 1 along the guide edge 3 and the zero point of which coincides with the axis A and a further linear scale is provided on the member 2 along the guide edge 4 the zero point of which also coincides with the axis A. A pointer 6 the leading edge 7 of which is collinear with the guide edge 3 projects from the periphery of the member 1 and indicates the angle defined by the two guide edges 3 and 4 against the scale 5a on the member 2. A further angular measure scale 5b the pole of which is also located on the axis A is provided on the member 1. The scale 5b bears two ranges, one extending from 0° on the guide edge 3 to 180° on the leading edge 7 of the pointer 6 and the other from 0° on the leading edge 7 to 180° on the guide edge 3. The edge 8 is collinear with the guide edge 4, and the location of this edge 8 with respect to the scale 5b indicates by means of the two ranges provided the angle formed by the guide edges 3 and 4 and also the angle formed by the guide edge 3 and the edge 8. For the entire range of this further scale 5b, the location of the edge 8 can be viewed through the member 1. In addition, for a portion of this range the edge 8 projects beyond the periphery of the member 1 adjacent the scale 5b.

A compass point 9 is provided on the member 2 adjacent its circumference and extends perpendicular to and just beyond the base of that member. The point 9 is provided for pivoting the entire instrument upon a drawing surface in order that it may function as a compass. In this case, light pressure applied to the point 9 with, for example, a finger tip causes it to engage the drawing surface for this purpose.

Several identical pairs of holes 12 are provided in the member 1 at successive and equal intervals along and on opposite sides of a line B which lies midway between and parallel to the line which is a tangent to the path of the compass point 9 at a point midway between the two extreme markings 0, +1 of a scale 11 on the member 1 and the line intersecting the two positions of the point 9 when it is successively opposite the two extreme markings 0, +1 of the scale 11. The axis of each hole is parallel to the axis A and the two holes of each pair are directly opposite one another on opposite sides of the line B.

A mark 10 which coincides with a radial line connecting the axis A with the axis of the point 9 is provided on the top surface of the member 2, adjacent the point 9, and co-operates with the scale 11 on the member 1 to indicate the variation in displacement of the point 9 with respect to the pairs of holes in a direction parallel to the line B as the point 9 swings about the axis A. The intervals between adjacent pairs of holes 12 are, in this case, 1 cm and equal to the distance between the perpendicular projection on to the line B of the position of point 9 when it is opposite the zero graduation of the scale 11 and the immediately adjacent pair of holes 12. The distance between the perpendicular projections on to the line B of the positions of point 9 when adjacent the two extremes of the scale 11 (0, +1), also equals these intervals, i.e. 1 cm.

Adjacent the row of holes 12 is a scale indicating the distance of each respective pair of holes from the perpendicular projection on to the line B of the position of the point 9 when adjacent the zero graduation of the scale 11. When the guide edges 3, 4 are collinear the point 9 is located in a recess 13 provided in the member 1 which substantially protects the point against damage when the instrument is in this position.

The two holes of each pair are of different diameters and are respectively provided to receive and support, without undue movement, the tip of a writing implement of corresponding dimensions. The point of the writing implement then protrudes just below the lower surface of the instrument.

With the point 9 against the zero graduation of the scale 11, a radius equal to a whole number of centimetres may be described by introducing a point of a writing implement in an appropriate one of the corresponding pairs of holes. For a radius the value of which is not a whole number of centimetres, the point 9 is rotated about the axis A along the scale 11 graduated in fractions of the interval between adjacent pairs of holes 12 thereby adding that fraction of a centimetre indicated on the scale to the corresponding whole number of centimetres obtained by the hole section. In this case, to reduce inaccuracies resulting from the effect of the arcuate movement of the point 9 its displacement against the scale 11 must be small in proportion to its distance from the axis A.

The arrangement by which the two members 1 and 2 are rotatably connected to one another will now be described. This arrangement comprises a substantially semi-annular slide member 14 provided with V-shaped grooves 15 on its circumferential edges and rectangular-sectioned grooves 16 extending along its base surfaces. The grooves 15 and 16 are concentric with the axis A. The slide member 14 is received in and bridges curved channels 17 and 18 provided in the members 1 and 2 respectively. The axis of curvature of each channel 17 and 18 is coincident with the axis A. The grooves 15 of the slide member 14 engage inwardly projecting ridges 19 which are wedge-shaped in section and located on the circumferences of the channels 17 and 18, allowing relative movement between the member 14 and the members 1 and 2 respectively. Rectangular-sectioned curved ridges 20 concentric with the axis A protrude from and extend along the channels 17 and 18. The ridges 20 engage the correspondingly shaped grooves 16 in the slide member 14 and improve the accuracy of concentricity of the member 14 with regard to the members 1 and 2.

Friction damping means are provided to damp relative movement between the members 1 and 2 and the slide member 14 thereby providing a resistance to slipping between the two members 1 and 2. The friction damping means comprise resilient tabs 21 and 22 formed in the base surfaces of the slide member 14. The tab 21 projects into the channel 17 of the member 1 and the tab 22 projects into the channel 18 of the member 2. The resilient tabs 21 and 22 bear frictionally against the members 1 and 2 respectively so as to force the bevelled bearing surfaces of the grooves 15 against the corresponding surfaces of the wedge-section ridges 19 in a substantially uniform manner throughout relative movement of the two members 1 and 2.

A projection 23 is provided on the member 1 in the channel 17 adjacent a base surface of the side member 14. Similarly a projection 24 is provided on the member 2 in the channel 18 adjacent the other base surface of the side member 14. The projections 23 and 24 act as abutments for the tabs 21 and 22 respectively. The projection 23, the projection 24, a face 26, and the under surface 25 of the inner portion of the guide edge 3 limit the movement of the slide member 14 during relative motion of the members 1 and 2 between two extreme positions of the members 1 and 2, namely, that in which the guide edges 3 and 4 lie together and that in which they are collinear.

The location of the projections 23 and 24 along the channels 17 and 18 respectively is such that, when the two guide edges 3 and 4 come together, a position in which the two members 1 and 2 do not overlap, substantially one half of the slide member 14 is retained in both channels 17 and 18, thereby maintaining the connection between the two members 1 and 2.

On moving the guide edge 4 towards the guide edge 3 from their collinear position, friction may cause the slide member 14 to remain wholly within the channel 17 of the member 1 until a position is reached in which the toe of the tab 22 abuts the projection 24, whereupon the slide member 14 is carried around with the member 2. The movement of the slide member 14 continues until the toe of the tab 21 abuts the projection 23. Thus, in all orientations of the member 1 with respect to the member 2, the tabs 21 and 22 are in contact with the respective members 1 and 2 so that the damping force applied is substantially constant.

On moving the guide edge 4 away from the guide edge 3 the slide member 14 tends through friction to remain stationery with respect to the channel 17 until the face 26 of the member 2 abuts the face 28 of the slide member 14 to return the slide member within the channel 17. Continuation of this motion brings the face 17 of the slide member 14 into abutment with the under surface 25, halting the relative motion between the slide 14 and the channel 17. The face 29 of the member 1 is arranged to abut the face 26 of the member 2 when the guide edges are collinear.

Thus, at no position does the slide arrangement intrude upon the guide edges 3 and 4 in a manner that impairs the guide function of these edges.

The above described embodiment of the present invention may readily be formed by, for example, injection moulding from a resilient plastics material such as, for example, high density polyethylene.

In the described embodiment, when the slide member 14 is initially inserted into the channels 17 and 18 during assembly, the tabs 21 and 22 are appropriately orientated so as to ride over and past the projections 23 and 24 respectively solely in the direction of insertion.

Although the members 1 and 2 of the above described embodiment are stated to be transparent, this is not an essential feature of the invention and either one or both of these members may be formed of opaque or translucent material.

Further, it is not essential that the angular measure scales be arranged in or of the form in the described embodiment. For example, an angular scale may be provided on a chosen one only of the two elements. Also the ranges of the or each scale may be different from that described above.

A clamp may be provided for holding one member in a selected orientation with respect to the other member. Such a clamp may be provided in substitution for, or in addition to, the damping means described and may comprise a screw which is received in and extending through a screw-threaded hole in the one member for tightening against a bearing surface provided on the other member.

The holes 12 on the first member need not be circular nor need they be provided in pairs. For example a single hole may be provided at intervals along the line B. In plan, each such single hole may be tapered or ogival in shape so as to present an apex which is aligned with a respective one of the scale markings indicating intervals along the line B and in which the tip of a drawing implement lodges when describing an arc. This arrangement allows a range of drawing implements of various tip dimensions to be used with this instrument. In one such embodiment, resilient means are also provided on the top surface of the member 1 against which the lower portion of the drawing implement may be levered, thereby forcing the tip of the implement in the drection of the apex of the hole selected.

To keep the compass point 9 clear of the drawing surface when it is not in use the point 9 may be located on a hinge or on a resilient arm on the member 2. In this case, the point is engaged with the drawing surface by applying pressure to the top of the arm on which it is mounted.

Extension arms may be provided for extending the drawing and scale range of the guide edges 3 and 4 and the range of the holes 12. These extension arms may be connected to the corresponding first and second members by clips.

Another embodiment may possess an overall shape of a 90°/45°/45° triangle when the guide edges 3 and 4 are in the collinear position. In this embodiment the guide edges 3 and 4 are of equal length and comprise the hypotenuse of this triangle when they are in the collinear position. The axis A, about which the edges 3 and 4 rotate, is located perpendicular to and midway along the hypotenuse thus separating the edge 3 from the edge 4. The member 1 presents one base edge of the triangle and a portion of the other base edge adjoining the right angle. In this portion close to the edge the holes 12 are located along the line B and the scale 11. The member 2 presents the remaining portion of the base edge and the compass point 9 which cooperates with the scale 11.

There may be omitted from the instrument of the invention the compass point 9, the scale 11 and the holes 12 and the resulting device may still be used an an angle-describing instrument.

The instrument of the invention may be arranged to perform the function of a draughting head when used in conjunction with a parallel motion drawing board. The members 1 and 2 are rotatably mounted to each other so as to pivot about the axis A via the slide 14. These three members are also rotatably mounted via an arcuate slide arrangement on a further slide member so as again to pivot about the axis A. This further slide member is then slideably mounted via grooves on a parallel motion bar so as to slide along the longitudinal axis of the bar. In this construction the axis A may be arranged perpendicular to and continuously coinciding with the top drawing edge of the parallel motion bar. The members 1, 2, and the slide 14 and the further slide member may be so arranged that when the guide edges 3 and 4 are in a collinear position with the top drawing edge no portion of the members 1, 2, and the slide 14 and the further slide member protrudes beyond the top drawing edge. In this position these members may remain within the area of the parallel motion bar defined by the top and bottom edges and therefore do not impede the function of describing a straight line along these edges. The members 1 and 2 still possess the ability to rotate a full 180° from their collinear positions.

Although the two members of the above described constructions may each have a semi-circular portion, this is not essential. For example, the instrument may have the form of an adjustable set-square resembling in plan the traditional type of adjustable set-square although there is the fundamental difference that its hypoteneuse edge is continuously in line with its centre of rotation, namely the point about which this edge swings in relation to the remaining portion of the instrument. Such an adjustable set-square does not therefore need to be re-positioned when its angular setting is altered. Such a construction will include as before two members 1 and 2 and the slide memebr 14. In the closed position, that is when the one member substantially overlies the other member the overall plan of the construction appears as a 45°/45°/90° triangle. The hypotenuse of this triangle forms the guide edge 3 of the member 1 the remaining shape of which substantially forms a 45°/45°/90° triangle. The two base edges form part of the member 2 the remaining shape of which also substantially forms a 45°/45°/90° triangle. One of these base edges forms the guide edge 4. The member 1 is rotatably mounted on the member 2 via an annular slide member 14 of substantially 45° so as to pivot about the axis A which is located perpendicular to and at the intersection of the guide edges 3 and 4, namely 45° apex when the instrument is in the closed position.

When the member 1 is rotated relatively to the member 2 the guide edge 3, which forms the hypotenuse in this construction rotates through an angle of 45° as in a traditional adjustable set-square. An angular measure scale 5a with a range of 45° whose pole co-incides with the axis A is preferably located on the member 2. The pointer 6, the leading edge 7 of which is collinear with the base edge 4 when this embodiment is in the closed position projects from the member 1 and thus indicates the angle defined by the hypotenuse guide edge 3 and the corresponding base edge.

Since a line described by the tip of an implement is not infinitely thin and is of a finite thickness, each of the guide edges 3, 4 and 8 in all the described constructions and variations may be uniformly displaced to a tangential position with respect to the axis A by half the thickness of the tip of an average drawing implement, for example a lead pencil, so that the path of the tip of the drawing implement intersects the axis A. An angle formed by the guide edges 3 and 4 under the above arrangement remains identical to an angle formed by these edges when they precisely intersect the axis A and under this displacement the zero point of the linear scale on the guide edge 3 and the zero point on the linear scale on the guide edge 4 remain radially adjacent the axis A. The leading edge 7 of the pointer 6 may also be similarly displaced to correspond to a displaced angular scale 5a or may remain radially orientated to the axis A so as to indicate the angle formed by the guide edges 3 and 4. Where the guide edges 3 and 4 are uniformly displaced to a tangential position with respect to the axis A either one or both portions of the edges 3 and 4 adjacent the axis A may be linearly extended to underlie the other so as to prevent the tip of an implement from passing through the apex of the angle formed by the guide edge 3 and the guide edge 4.

The guide edges 3 and 4 may be formed with points 30 and 31 respectively so that the instrument may be used as dividers.

The instrument of the present invention in its different variations is applicable to a wide variety of fields including among others, the classroom, the chart room of ships and drawing offices. In addition, at least some forms of the invention may be used in a three-dimensional context for example, in obtaining directly the angular and linear dimensions of a three-dimensional object.

What I claim is:

1. A drawing instrument comprising:
   two substantially planar members, each said planar member having a straight edge;
   a connecting means for connecting said planar members in spaced relationship in parallel planes so as to have adjacent faces movable concentrically, said connecting means including respective curved channels formed on said adjacent faces, a curved connecting piece located entirely in the space between said planar members which slidably engages and bridges said curved channels, and an interengaging means for accurately interengaging said two planar members to improve the positional accuracy therebetween including ridges provided on the adjacent faces of each said planar member and corresponding grooves provided in said connecting piece; and
   a common axis located substantially at one end of said guide edge of each of said planar members about which said curved channels, said ridges and said grooves are all curved such that said two planar members slide relative to said connecting piece and to one another about said common axis from one extreme position where said guide edges are arranged co-planar and lie together to another extreme position where said guide edges are aligned with one another.

2. A drawing instrument as claimed in claim 1, in which the guide edges are displaced by a small uniform distance from said axis so that they do not intersect said axis.

3. A drawing instrument as claimed in claim 1, in which one of the planar members includes a compass point engageable with a surface so that the entire instrument may be swung on the surface about the compass point and the other member is formed with at least one hole for passage of a scribing or a drawing implement the marking point of which is engageable with the surface.

4. A drawing instrument as claimed in claim 3, in which said other member is formed with at least one line of through holes arranged at equal successive intervals in a straight line along the member, and in which an axis of the compass point and axes of each of the holes are all substantially parallel with the common axis.

5. A drawing instrument as claimed in claim 1, in which frictional damping means are provided to damp relative rotational movement between the two members.

6. A drawing instrument as claimed in claim 5, in which the frictional damping means comprises resilient tabs presented by the connecting piece, said tabs being arranged to bear frictionally against the respective planar members.

7. A drawing instrument according to claim 6, in which a projection is formed on each planar member, each projection being located to be engaged by a respective one of said tabs when the planar members are in the position in which their guide edges lie together.

8. A drawing instrument as claimed in claim 1, in which one planar member includes a pointer movable with said one member as the member rotates against the other member over indicia presented by said other member to indicate the angle of rotation of said one member relative to said other member.

9. A drawing instrument as claimed in claim 1, in which side walls of the channels in the planar members are formed with inwardly projecting ridges and circumferential edges of said connecting piece are formed with V-shaped grooves engaging said ridges.

* * * * *